June 24, 1969     T. W. WALDROP     3,451,725
HARVESTER SPOUT CONTROL
Filed Jan. 2, 1968
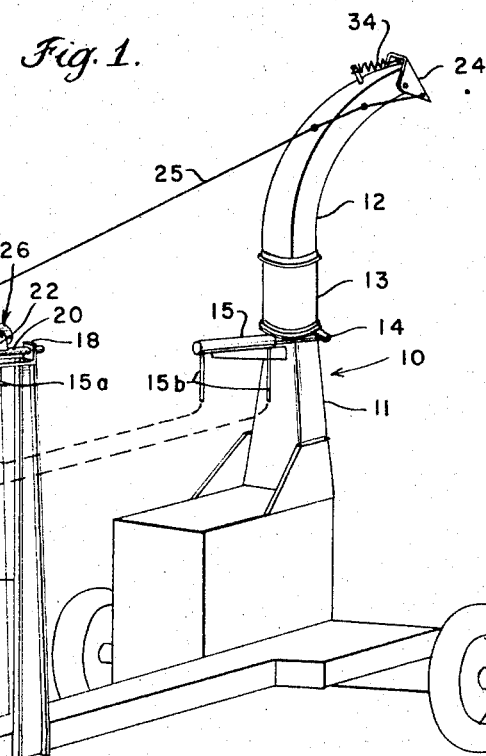
Fig. 1.
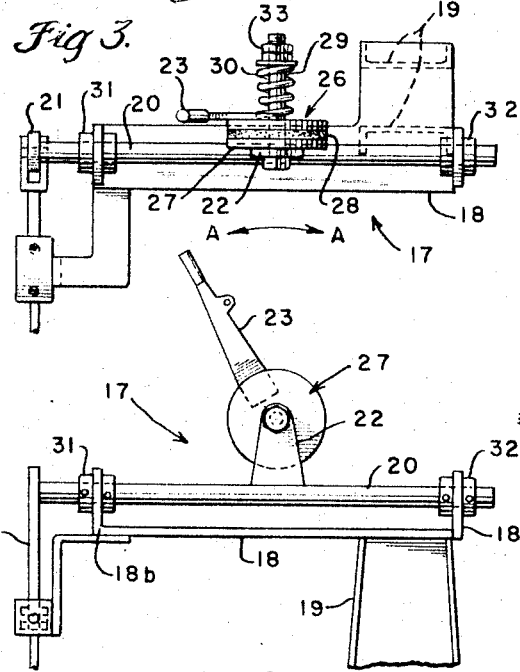
Fig. 2.
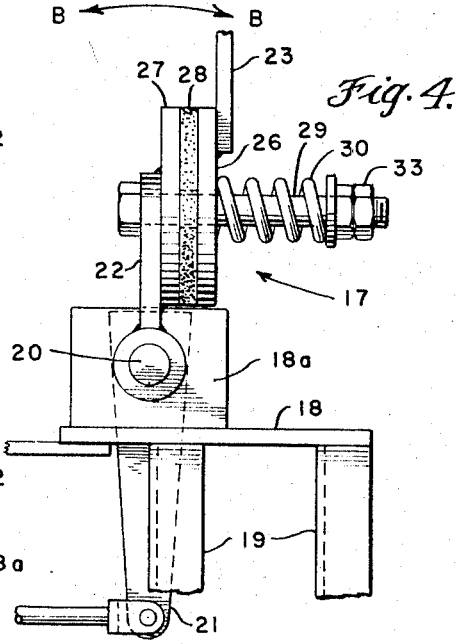
Fig. 3.
Fig. 4.
INVENTOR.
THOMAS W. WALDROP
BY
*Joseph A. Brown*
ATTORNEY

United States Patent Office 3,451,725
Patented June 24, 1969

3,451,725
HARVESTER SPOUT CONTROL
Thomas W. Waldrop, Ronks, Pa., assignor to Sperry Rand Corporation, New Holland, Pa., a corporation of Pennsylvania
Filed Jan. 2, 1968, Ser. No. 695,134
Int. Cl. B65g 53/42, 53/04; A01f 12/48
U.S. Cl. 302—34                                 5 Claims

ABSTRACT OF THE DISCLOSURE

A harvester spout control device which is adapted to rotate a harvester spout and control an associated deflection member simultaneously in response to operation of a single pivotally mounted lever.

Background of the invention

This invention relates generally to crop harvesters and particularly to a control means for accurately directing a stream of crop material from a harvesting machine into a receiving unit by establishing a delivery position of the spout and its associated deflector.

Forage harvesters are generally provided with a discharge spout which is rotatable about the vertical axis of a spout inlet so that the crop may be discharged in various horizontal directions. This feature allows the crop material to be delivered to a receiving unit which is either rearwardly or laterally spaced from the machine.

To provide for controllable discharge at uniform depths in the receiving unit, a deflector element is usually disposed in a pivotal relation to the spout discharge outlet. The deflector, due to the pivotal positioning thereof, is adapted to engage and deflect, or guide, the stream of crop material leaving the spout outlet.

Both the spout and deflector directions are manually positionable by a control device generally located at the front of the machine within reach of the operator towing the harvester. For the most part, the control means employs an axially shiftable, rotatable shaft which positions the spout when rotated in one axial position and the deflector when rotated in a second axial position, or separate control levers which individually operate the spout and the deflector.

Summary of the invention

According to the present invention, the position of the discharge spout and the deflector member is established by operating a single lever. The control device is comprised of a lever which is pivotally movable in two planes. Lateral movement of the lever causes rotation of the spout, while fore-and-aft movement will result in actuation of the deflector.

Description of the drawings

FIG. 1 is a perspective view of a harvester machine showing the spout control apparatus' operable relation.
FIG. 2 is a side elevation of the control device.
FIG. 3 is a plan view of FIG. 2.
FIG. 4 is an enlarged plan elevation of the view of FIG. 2.

Referring now to the drawings, FIG. 1 shows a harvester 10 having a stationary spout section 11 and an upper swivel spout section 12. A generally cylindrical section 13, disposed between the stationary portion 11 to portion 12, is connected to portion 12 and provides for the rotational relationship between the two sections. An arm 14, connected at one end to the lower portion of cylinder 13, extends outwardly from the spout. The outward end of arm 14 is adapted to be connected to an actuating device, such as hydraulic cylinder 15, for operation as will hereinafter be described in detail.

The control device is comprised, in part, of a pivotal rod 20 supported in suitable bearings, a first disc 27 suitably fixed in relation to rod 20, a second disc 26 mounted adjacent disc 27 and in rotatable relation therewith, a friction pad 28 disposed between discs 26 and 27 and a lever arm 23 fixed to disc 26, as shown in FIGS. 2, 3, and 4.

Specifically, a substantially L-shaped horizontally disposed plate member 18, having upstanding arms 18a and 18b, is fixed to the upper ends of a pair of parallel stanchions 19. Rod 20 is supported horizontally for pivotal, or rotational, movement in bearings 31 and 32. The bearings are located in arms 18a and 18b as shown in FIGS. 2 and 3.

One end of rod 20 has a valve actuating arm 21 fixed thereto. The actuating arm is connected to a suitable valve means 16, shown in FIG. 1, which valve is provided with a fluid inlet 15a and outlet lines 15b. Outlet lines 15b are connected to cylinder 15 and provide a suitable supply of hydraulic fluid to the cylinder to make it operable. As rod 20 is rotated either left or right, as shown by the arrows B—B in FIG. 4, actuating arm 21 is likewise rotated causing fluid to be supplied to one side or the other of the cylinder 15 operating chamber. Actuation of cylinder 15 causes a corresponding rotational actuation of spout 12 through arm 14 and pivotal cylinder 13.

A bracket 22 fixed to rod 20, intermediate the ends thereof, extends upwardly from the rod. A disc 27 is symmetrically fixed to bracket 22, as shown in FIG. 2. An aperture is provided in bracket 22 and disc 27 which is adapted to receive a bolt 29 therethrough. A second disc 26, also having a centrally disposed aperture, is received on bolt 29, while a friction pad 28 is positioned intermediate the discs. A biasing spring 30 is positioned around bolt 29 with one abutting disc 26, while the other end abuts suitable retaining means 33. Spring 30 causes a biasing force to be applied to disc 26, forcing the disc against the friction pad and disc 27 so as to provide a friction locking means. It will be apparent that the binding action of this joint may be varied by adjusting the retaining means 33 toward or away from spring 30 to vary the spring tension.

A lever arm 23 is fixed to disc 26 by any suitable means and extends upwardly therefrom. Fixed intermediate the ends of lever 23 is a cable 25, shown in FIG. 1, extending between the lever and a deflector member 24 which is pivotally mounted to cover the discharge outlet of spout section 12. As lever 23 is rotated fore and aft, as shown by arrows A—A in FIG. 2, the deflector 24 is caused to pivot. A deflector biasing means 34 and the friction pad 28 cooperate to hold the deflector in position once it is set by the lever. When it is necessary to change the deflector position the biasing means and friction pad cooperate to provide a positively responsive deflector angle control means.

As will be apparent from the foregoing description, the spout and deflector positions may be established through operation of a single control lever. With the actuation of lever 23 it is possible to cause a simultaneous rotation of spout 12 and deflection of deflector 24. The friction locking arrangement of the deflector control prevents fluctuation of the deflector during operation, while the hydraulic actuating means for spout rotation presents a more efficient method having a faster response than methods used heretofore.

While this invention has been described in connection with a particular embodiment thereof, it will be understood that it is capable of modification, and this application is intended to cover any variations, uses, or adaptations following, in general, the principles of the invention and including such departures from the present disclosure as come within the known or customary practice in the art to which the invention pertains, and as fall within the scope of the invention or the limits of the appended claims.

Having thus described my invention, what I claim is:

1. A harvester spout control device comprising, in combination, a harvester including a spout portion, control means mounted on said harvester, first means operable by said control means for regulating hydraulic means to rotate said spout portion and second means operable by said control means for pivotally positioning a deflector with respect to said spout, said first and second means being capable of simultaneous operation.

2. A harvester spout control device, as recited in claim 1, wherein a pair of parallel stanchions are mounted on said harvester and said control means is mounted on said stanchions, said control means including rod means pivotal in a lateral direction for operating said first means and lever means movable in a fore-and-aft direction for operating said second means.

3. A harvester spout control device, as recited in claim 2, wherein said stanchions are mounted forwardly on said harvester and said control means further includes a plate mounted on said stanchion ends, bearings mounted in said plate in spaced apart relation, said bearings pivotally supporting said rod, operating means connected at one end of said rod and pivotal therewith, a bracket on said rod intermediate the ends thereof, a first disc fixed to said bracket, a second disc rotatably supported by said bracket adjacent said first disc, a friction pad between said discs and biasing means for forcing said discs and said pad together to resist relative rotation therebetween, said lever means being fixed to said second disc for rotation therewith as force is applied to said lever, said lever being movable laterally with said rod for operating said first means and said lever being movable in a fore-and-aft direction for operating said second means.

4. A harvester spout control device, as set forth in claim 3, wherein said first means operable by said control means comprises a valve member operable by lateral pivoting of said operating means by said lever and said rod and said hydraulic means comprising an operating cylinder controlled by said valve, said cylinder being operably connected to said spout portion for rotation thereof in response to movement of said valve.

5. A harvester spout control device, as recited in claim 3, wherein said second means operable by said control means comprises a cable extending between said lever and said deflector wherein fore-and-aft movement of said lever will pivotally position said deflector in relation to said spout.

References Cited

UNITED STATES PATENTS

| | | | |
|---|---|---|---|
| 2,916,330 | 12/1959 | Dumanowski | 302—34 |
| 3,075,813 | 1/1963 | Vohl | 302—61 |
| 3,251,631 | 5/1966 | Hennen | 302—34 |
| 3,265,444 | 8/1966 | Waldrop | 302—61 |

ANDRES H. NIELSEN, *Primary Examiner.*

U.S. Cl. X.R.

302—61